United States Patent
Sampath et al.

(10) Patent No.: US 7,161,948 B2
(45) Date of Patent: *Jan. 9, 2007

(54) HIGH SPEED PROTOCOL FOR INTERCONNECTING MODULAR NETWORK DEVICES

(75) Inventors: Srinivas Sampath, Sunnyvale, CA (US); Mohan Kalkunte, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 10/171,573

(22) Filed: Jun. 17, 2002

(65) Prior Publication Data

US 2003/0174719 A1 Sep. 18, 2003

Related U.S. Application Data

(60) Provisional application No. 60/364,135, filed on Mar. 15, 2002.

(51) Int. Cl.
*H04L 12/28* (2006.01)
*H04L 12/56* (2006.01)
*H04L 12/66* (2006.01)
*H04L 12/50* (2006.01)

(52) U.S. Cl. .................................................. 370/402
(58) Field of Classification Search ........ 370/389–406, 370/498, 492, 432, 230–235, 352, 475, 421; 710/104; 700/97; 711/167, 154, 168
See application file for complete search history.

(56) References Cited

U.S. PATENT DOCUMENTS 4,562,535 A * 12/1985 Vincent et al. ............. 710/104
5,416,773 A    5/1995  Gamm
5,535,366 A    7/1996  Pfeiffer et al.
5,781,549 A    7/1998  Dai
5,825,772 A   10/1998  Dobbins et al.
5,909,686 A    6/1999  Muller et al.
6,195,593 B1 * 2/2001  Nguyen ....................... 700/97
6,788,680 B1 * 9/2004  Perlman et al. ............. 370/389
2001/0012294 A1 8/2001  Kadambi et al.
2003/0133451 A1* 7/2003  Mahalingaiah ............... 370/389

FOREIGN PATENT DOCUMENTS

WO              99/00936       1/1999

* cited by examiner

*Primary Examiner*—Chi Pham
*Assistant Examiner*—Prenell Jones
(74) *Attorney, Agent, or Firm*—Squire, Sanders & Dempsey L.L.P.

(57) ABSTRACT

A network switch for network communications is disclosed. The switch includes a first data port interface, supporting at least one data port transmitting and receiving data at a first data rate and a second data port interface, supporting at least one data port transmitting and receiving data at a second data rate. A memory management unit for communicating data from at least one of the first data port interface and the second data port interface and a memory is also included. The switch uses a communication channel for communicating data and messaging information between the first data port interface, the second data port interface, and the memory management unit. The switch also has a plurality of lookup tables, including an address resolution lookup table, a VLAN table and module port table. The network switch has a unique module identifier and of the first data port interface and the second data port interface is configured to determine forwarding information from a header for an incoming data packet received at a port of the one data port interface. The port interfaces are configured to determine the forwarding information from the header and to determine a destination module identifier for a destination port for the data packet from the module port table.

12 Claims, 7 Drawing Sheets

HIGH SPEED PROTOCOL FOR INTERCONNECTING MODULAR NETWORK DEVICES

This nonprovisional application claims the benefit of U.S. Provisional Application No. 60/364,135, filed Mar. 15, 2002. The contents of the provisional application are hereby incorporated by reference.

BACKGROUND OF THE INVENTION

1. Field of Invention

The present invention relates to a method and apparatus for allowing data to be passed between interconnected network devices. More specifically, the method and apparatus allows for the use of a specific protocol to allow for this communication between network devices.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks.

Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic ethernet wirespeed is up to 10 megabits per second, and Fast Ethernet is up to 100 megabits per second. The newest Ethernet is referred to as gigabit Ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. One such problem occurs when multiple switches are used to provide higher port densities. When such configurations of chips occur, additional logic must be employed to allow for data received at one of the interconnected switches to be forwarded to another of the interconnected switches.

As such, there is a need in the prior art for an efficient method and means for forwarding data between interconnected switches. In addition, there is a need for a standard that can be relied on to ensure the proper switching of data, including unicast, broadcast, layer 2 multicast, IP multicast, unknown unicast and control frames. Such a standard would need to be compatible with the existing forwarding hardware and allow for the transfer between switches to be transparent.

SUMMARY OF THE INVENTION

It is an object of this invention to overcome the drawbacks of the above-described conventional network devices and methods. The present invention provides for a new protocol to act as a standard mechanism to allow for the interconnection of network devices to form a single system. With this approach, several network devices can be combined to form a system with high port density and the protocol simplifies the hardware forwarding decisions of the system as data is passed from one constituent device to another.

According to one aspect of this invention, a network switch for network communications is disclosed. The switch includes a first data port interface, supporting at least one data port transmitting and receiving data at a first data rate and a second data port interface, supporting at least one data port transmitting and receiving data at a second data rate. A memory management unit for communicating data from at least one of the first data port interface and the second data port interface and a memory is also included. The switch uses a communication channel for communicating data and messaging information between the first data port interface, the second data port interface, and the memory management unit. The switch also has a plurality of lookup tables, including an address resolution lookup table, a VLAN table and module port table. The network switch has a unique module identifier and of the first data port interface and the second data port interface is configured to determine forwarding information from a header for an incoming data packet received at a port of the one data port interface. The port interfaces are configured to determine the forwarding information from the header and to determine a destination module identifier for a destination port for the data packet from the module port table.

Additionally, the one of the first data port interface and the second data port interface can be configured to send the data packet over a specialized interface to a connected second network switch when the destination module identifier is different from the unique module identifier of the network switch. Also, the header may contain an opcode that identifies whether the incoming data packet is a unicast packet, a multicast packet, a broadcast packet or resulted in a destination lookup failure. When the at least one of the first data port interface and the second data port interface is configured to be a member of a trunk group, and the one of the first data port interface and the second data port interface is configured to determine the destination port for the data packet based on the opcode.

According to another aspect of this invention, a method of switching data in a network switch is disclosed. An incoming data packet is received at a first port of a switch and a first packet portion, less than a full packet length, is read to determine particular packet information, the particular packet information including a source address and a destination address. A destination port and a destination module identifier is obtained from a module port table based on the particular packet information and the destination module identifier is compared with a unique module identifier for the network switch. The incoming data packet is then sent to the destination port.

Additionally, the data packet can be sent over a specialized interface to a connected second network switch when the destination module identifier is different from the unique module identifier of the network switch. Also, the header may contain an opcode that identifies whether the incoming data packet is a unicast packet, a multicast packet, a broadcast packet or resulted in a destination lookup failure and the opcode is read from the first packet portion. When the destination port is a member of a trunk group, the destination port for the data packet is determined based on the opcode.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The HiGig protocol provides a standard mechanism to interconnect switches to form a single system. Such a system can be several stacked switches or a chassis system with several switch blades and fabric switch blades. The HiGig protocol enables the forwarding of packets for unicast, broadcast, layer 2 multicast, IP multicast, unknown unicast and control frames. In addition, it also allows port monitoring across multiple switches and also eternalizes packet classification information from the switch. An exemplary embodiment of a switch is discussed below to provide a framework for use of the HiGig protocol.

Figure 1:
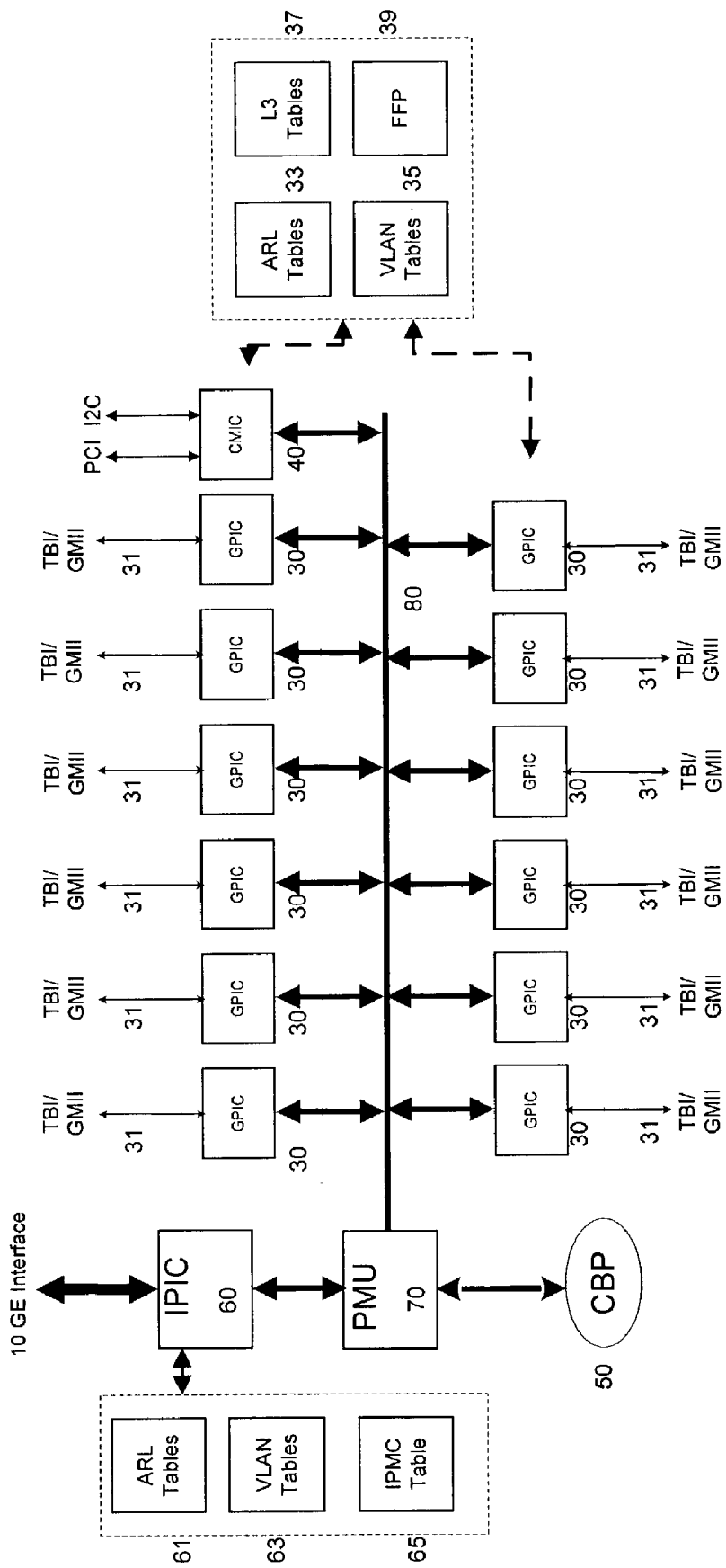
FIG. 1 is a general block diagram of elements of the present invention.

FIG. 1 illustrates a configuration wherein a switch-on-chip (SOC) 10, in accordance with the present invention, is illustrated. The following are the major blocks in the chip: Gigabit Port Interface Controller (GPIC) 30; Interconnect Port Interface Controller (IPIC) 60; CPU Management Interface Controller (CMIC) 40; Common Buffer Pool (CBP)/Common Buffer Manager (CBM) 50; Pipelined Memory Management Unit (PMU) 70; and Cell Protocol Sideband (CPS) Channel 80. The above components are discussed below. In addition, a Central Processing Unit (CPU) can be used as necessary to program the SOC 10 with rules which are appropriate to control packet processing. However, once SOC 10 is appropriately programmed or configured, SOC 10 operates, as much as possible, in a free running manner without communicating with CPU.

The Gigabit Port Interface Controller (GPIC) module interfaces to the Gigabit port 31. On the medium side it interfaces to the TBI/GMII or MII from 10/100 and on the chip fabric side it interfaces to the CPS channel 80. Each GPIC supports 1 Gigabit port or a 10/100 Mbps port. Each GPIC performs both the ingress and egress functions.

On the Ingress the GPIC supports the following functions: 1) L2 Learning (both self and CPU initiated); 2) L2 Management (Table maintenance including Address Aging); 3) L2 Switching (Complete Address Resolution: Unicast, Broadcast/Multicast, Port Mirroring, 802.1Q/802.1p); 4) FFP (Fast Filtering Processor), including the IRULES Table); 5) a Packet Slicer; and 6) a Channel Dispatch Unit.

On the Egress the GPIC supports the following functions: 1) Packet pooling on a per Egress Manager (EgM)/COS basis; 2) Scheduling; 3) HOL notification; 4) Packet Aging; 5) CBM control; 6) Cell Reassembly; 7) Cell release to FAP (Free Address Pool); 8) a MAC TX interface; and 9) Adds Tag Header if required.

It should be noted that any number of gigabit ethernet ports 31 can be provided. In one embodiment, 12 gigabit ports 31 can be provided. Similarly, additional interconnect links to additional external devices and/or CPUs may be provided as necessary.

The Interconnect Port Interface Controller (IPIC) 60 module interfaces to CPS Channel 80 on one side and a high speed interface, called HiGig™ interface, on the other side. The HigGig is a XAUI interface, providing a total bandwidth of 10 Gbps.

The CPU Management Interface Controller (CMIC) 40 block is the gateway to the host CPU. In it's simplest form it provides sequential direct mapped accesses between the CPU and the CHIP. The CPU has access to the following resources on chip: all MIB counters; all programmable registers; Status and Control registers; Configuration registers; ARL tables; 802.1Q VLAN tables; IP Tables (Layer-3); Port Based VLAN tables; IRULES Tables; and CBP Address and Data memory.

The bus interface is a 66 MHz PCI. In addition, an I2C (2-wire serial) bus interface is supported by the CMIC, to accommodate low-cost embedded designs where space and cost are a premium. CMIC also supports: both Master and Target PCI (32 bits at 66 MHz); DMA support; Scatter Gather support; Counter DMA; and ARL DMA.

The Common Buffer Pool (CBP) 50 is the on-chip data memory. Frames are stored in the packet buffer before they are transmitted out. The on-chip memory size is 1.5 Mbytes. The actual size of the on-chip memory is determined after studying performance simulations and taking into cost considerations. All packets in the CBP are stored as cells. The Common Buffer Manager (CBM) does all the queue management. It is responsible for: assigning cell pointers to incoming cells; assigning PIDs (Packet ID) once the packet is fully written into the CBP; management of the on-chip Free Address Pointer pool (FAP); actual data transfers to/from data pool; and memory budget management.

When a port is in TurboGig mode, it can operate in speed in excess of 2.5 Gbps. The transmit IPG on the port should be at 64 bit times. The FFP support on the TurboGig is a subset of the masks. A total of 128 IRULES and 4 IMASKs are supported when the port is in TurboGig mode. A total of 16 meter-ds is supported on the FFP.

The Cell Protocol Sideband (CPS) Channel 80 is a channel that "glues" the various modules together as shown in FIG. 1. The CPS channel actually consists of 3 channels:
  a Cell (C) Channel: All packet transfers between ports occur on this channel;
  a Protocol (P) Channel: This is a synchronous to the C-channel and is locked to it. During cell transfers the message header is sent via the P-channel by the Initiator (Ingress/PMMU); and a Sideband (S) Channel: its functions are: CPU management: MAC counters, register accesses, memory accesses etc; chip internal flow control: Link updates, out queue full etc; and chip inter-module messaging: ARL updates, PID exchanges, Data requests etc. The side band channel is 32 bits wide and is used for conveying Port Link Status, Receive Port Full, Port Statistics, ARL Table synchronization, Memory and Register access to CPU and Global Memory Full and Common Memory Full notification.

When the packet comes in from the ingress port the decision to accept the frame for learning and forwarding is done based on several ingress rules. These ingress rules are based on the Protocols and Filtering Mechanisms supported in the switch. The protocols which decide these rules are 802.1d (Spanning Tree Protocol), 802.1p and 802.1q. Extensive Filtering Mechanism with inclusive and exclusive Filters is supported. These Filters are applied on the ingress side and depending on the outcome different actions are taken. Some of the actions may involve changing the 802.1p priority in the packet Tag header, changing the Type Of Service (TOS) Precedence field in the IP Header or changing the egress port.

Figure 2:
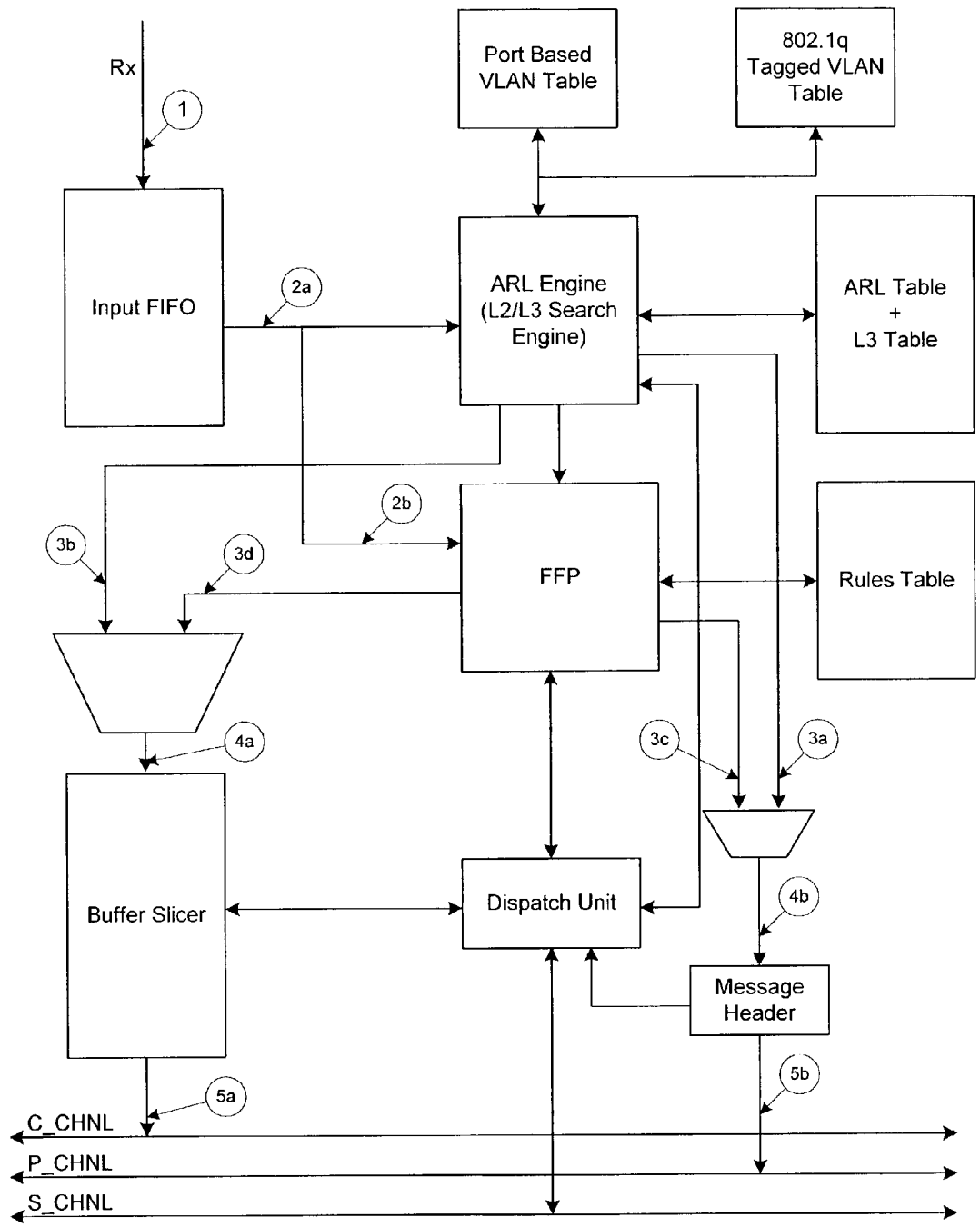
FIG. 2 is a data flow diagram of a packet on ingress to the switch.

The data flow on the ingress into the switch will now be discussed with respect to FIG. 2. As the packet comes in, it is put in the Input FIFO, as shown in step 1. An Address Resolution Request is sent to the ARL Engine as soon as first 16 bytes arrive in the Input FIFO (2*a*). If the packet has 802.1q Tag then the ARL Engine does the lookup based on 802.1q Tag in the TAG BASED VLAN TABLE. If the packet does not contain 802.1q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address+VLAN Id. If the result of the ARL search is one of the L3 Interface Mac Address, then it does the L3 search to get the Route Entry. If an L3 search is successful then it modifies the packet as per Packet Routing Rules.

At step 2*b*, a Filtering Request is sent to Fast Filtering Processor (FFP) as soon as first 64 bytes arrive in the Input FIFO. The outcome of the ARL search, step 3*a*, is the egress port/ports, the Class Of Service (COS), Untagged Port Bitmap and also in step 3*b* the modified packet in terms of Tag Header, or L3 header and L2 Header as per Routing Rules. The FFP applies all the configured Filters and results are obtained from the RULES TABLE. In general, the COS field in the various tables used in the present invention is the PRIORITY value and not a mapped COS.

Additionally, the Output Port or Egress port in the Rules table should not be an IPIC port. When filtering on Dest Port field, it doesn't affect the packets going to the Dest Port due to BC/MC. FFP actions will apply only to the unicast packets that are going to the DestPort. If bit 16 in FFP Rules Table is set, the Classification Tag is treated as the bitmap to be ANDed with the port bitmap. Bit 16 and bit 14 in FFP rules table are mutually exclusive.

The outcome of the Filtering Logic, at 3*c*, decides if the packet has to be discarded, sent to the CPU or, in 3*d*, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, in 4*a*, are applied to modify the packet in the Buffer Slicer. Based on the outcome of ARL Engine and FFP, 4*b*, the Message Header is formed ready to go on the Protocol Channel. The Dispatch Unit sends the modified packet over the cell Channel, in 5*a*, and at the same time, in 5*b*, sends the control Message on the Protocol Channel. The Control Message contains the information such as source port number, COS, Flags, Time Stamp and the bitmap of all the ports on which the packet should go out and Untagged Bitmap.

Figure 3:
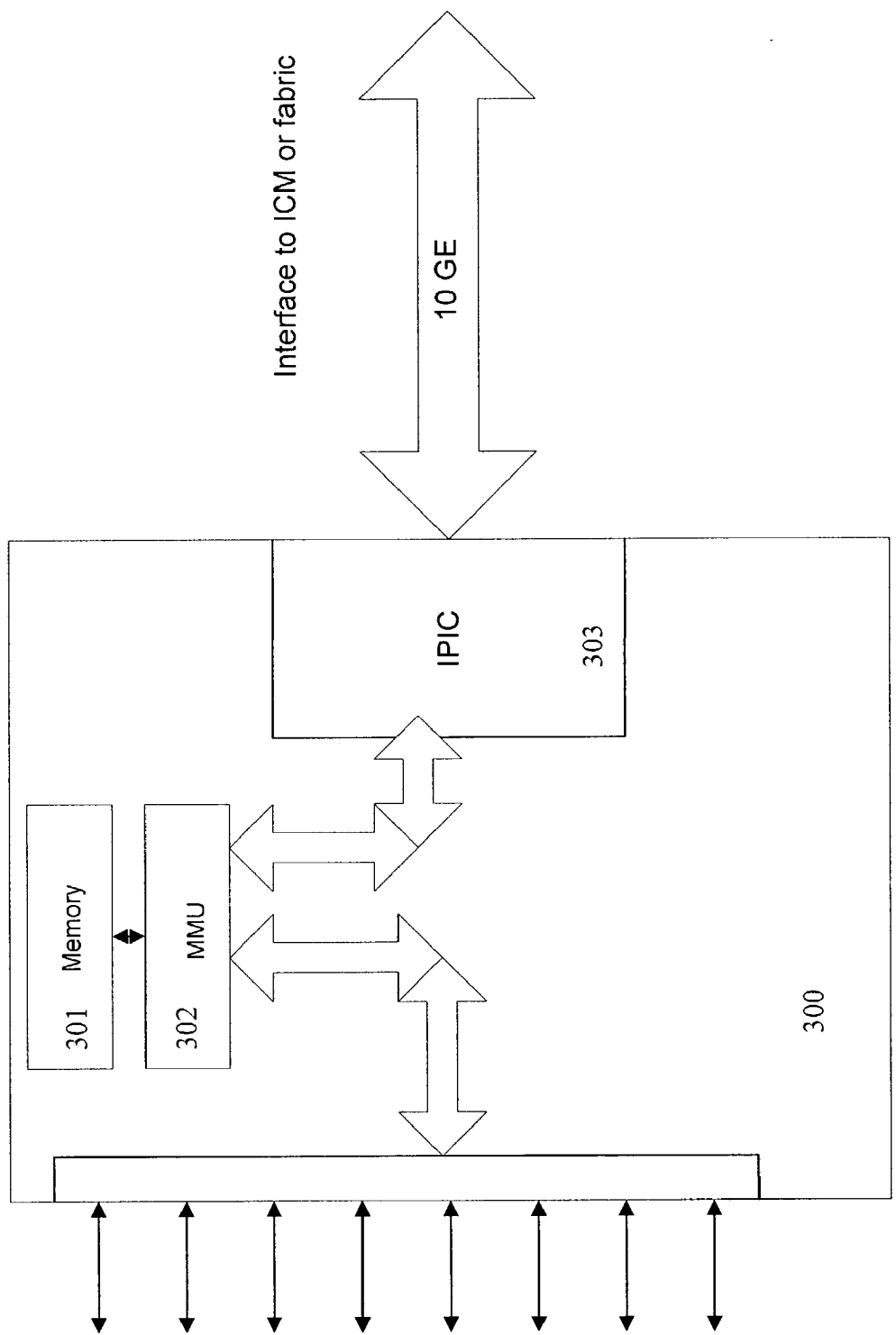
FIG. 3 illustrates the interconnect Port Interface Controller (IPIC) Module used to interface the switch to other switching devices through a cross-bar fabric or through a ring.

The Interconnect Port Interface Controller (IPIC) Module 303 is used to interface the device of the present invention to other like devices through a cross-bar fabric or through a Ring. FIG. 3 below shows a switch of the present invention having components interfacing to an Interconnect Module (ICM). The IPIC module 303 interfaces to the CPS Channel on one side and the 10-Gigabit Ethernet on the other side. The 10GE Interface is a high-speed data connection with a bandwidth up to 10 Gbps full duplex.

Figure 4:
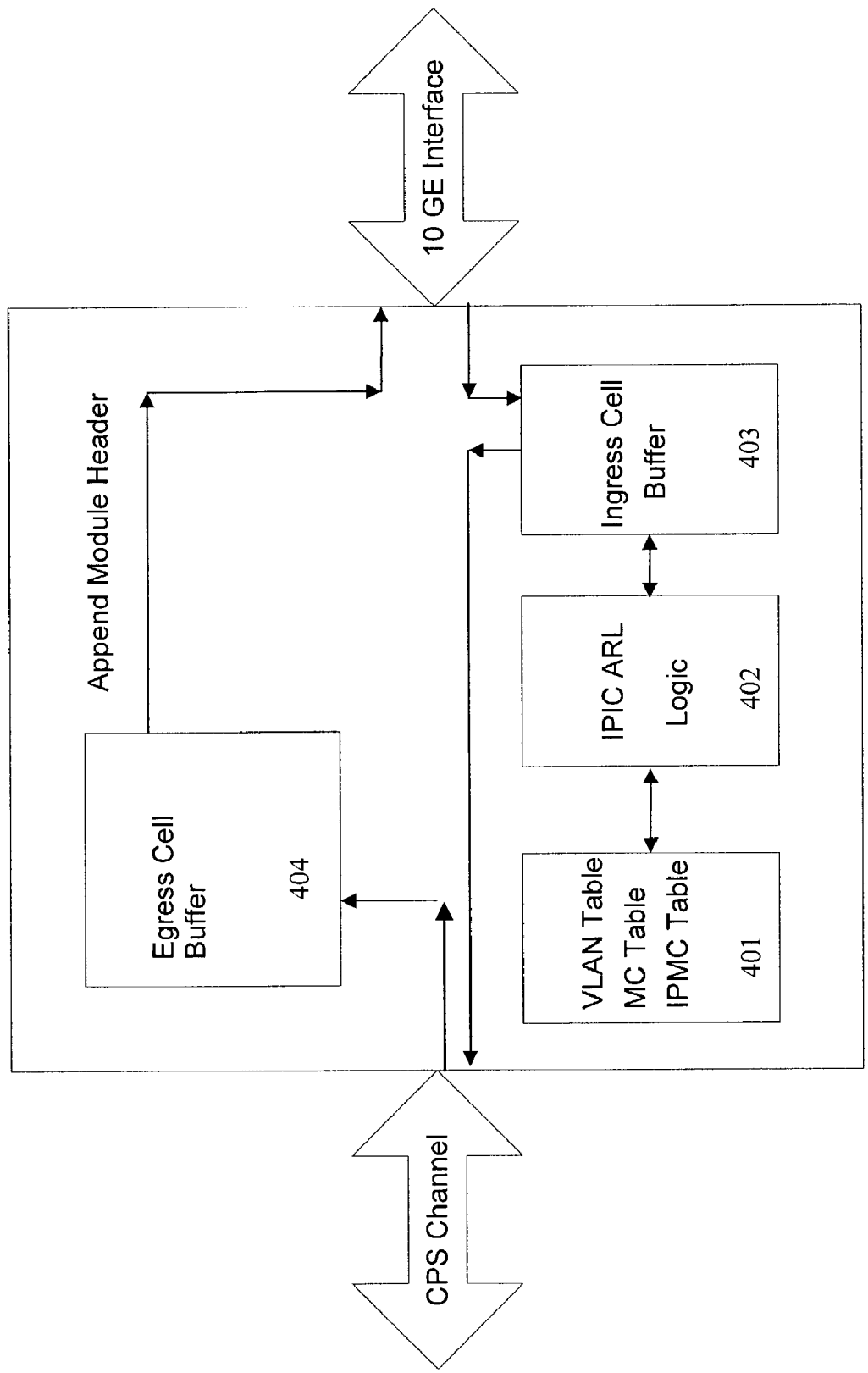
FIG. 4 illustrates the high level functions of the IPIC.

The high level functions of the IPIC are described below and illustrated in FIG. 4. First, the IPIC receives cells from the MMU 302 and sends the Frame out on the 10GE Interface. The egress function in the IPIC requests cells from the MMU 302 to transmit. If there are cells queued for the IPIC in the MMU, the MMU will send the cells to the IPIC. IPIC will also append the appropriate Module header. The IPIC gets the information to be appended in the Module Header from the P-Channel fields. This information includes Module Opcodes, Module Id Bitmap, Egress port, COS, Source Trunk Group Id or Source port of the packet etc. The IPIC also strips the VLAN tag from the current position in the packet (after the SA) and will insert 2 bytes of VID+ Priority+CFI in front of the Module Header. The IPIC then sends the Frame along with the constructed Module Header onto the 10GE Interface.

In a second function, the IPIC receives Frames from the 10GE and sends the cells on the CP Channels to the MMU after the Address Resolution is done. The Frame is received from the 10GE Interface. IPIC has a shallow buffer to store the frame. IPIC strips the 2 bytes of tag header and the Module Header. Module Header is the header appended to the frame by the Source Module. The Tag header is re-inserted in the packet after the SA along with the VLAN Type of 0×8100 (totally 4 bytes). IPIC goes through IPIC ARL Logic, which is described in the IPIC ARL Logic Flowchart below. The Source MAC Address of the packet is learnt in the IPIC ARL Table. The Source Module, Source Port and the VLAN ID of the packet is picked up from the Module Header which gets populated in the IPIC ARL Table.

If the packet is unicast (as indicated by the Module Opcode), the egress port is contained in the module header. This packet is forwarded to the egress port under the following conditions 1) M=0 and 2) M=1 and SMM=1. If the packet is a broadcast or an unknown unicast (DLF) that is identified by the Module Opcode, the packet is flooded to all members of the associated VLAN. The VLAN bitmap is picked up from the IPIC VTABLE. If the packet is Multicast and IPMC_DISABLE bit is NOT set, the egress port(s) is(are) picked up from the IPIC IPMC Table. If the packet is Multicast and IP_MC_DISABLE bit is set, the egress port(s) is(are) picked up from the IP IC MC Table. From the address resolution the egress port(s) is(are) decided and the Port Bitmap is constructed, the packet is sliced into 64 byte cells and these cells are sent to the MMU over the CP Channel. The Opcode value in the Module header is mapped to the Mod Opcode in the P-Channel. If the egress port is mirrored and the MTP is on another module, then the Port Bitmap will also include the IPIC port to be sent out. This packet will be sent to the Mirrored-to-port only.

The CPU should program layer 2 Multicast Entries in the L2_TABLE with L2MC bit set and STATIC bit set. The COS destination for the entry is picked up from the L2 Table. Since an IP packet on a stack link (Simplex or Duplex stack configurations) hits the L2_TABLE, the L3 bit in tL2_TABLE entry should not be set. Otherwise the TTL will be decremented multiple times (i.e., packets arriving on stack link can not be addressed to Router MAC address).

The incoming packet from the 10GE is stored in the Shallow Buffer. After getting the first 48 bytes of the Packet+8 bytes of the Module Header, the IPIC ARL Logic sends the ARL Request to do the Address Resolution, only if the Opcode value in the Module Header is set to a non zero value, i.e. the packet is a Unicast, Multicast, Broadcast or a DLF. The ARL Logic for IPIC is quite different from that of any other ingress port. The differences include that the Packet starts after 8 bytes of the Module Header. In addition, the IPIC port should be programmed as a member of the PORT_BITMAP if the VLAN spans multiple modules.

In addition, the Module header contains the information whether it is a Control Frame or Data Frame. The Control Frame is always sent to the CPU after stripping the Module Header. The Trunk Group Identifier of the port is picked up from the Module Header and for the unicast packet where the Address Resolution is done by the Ingress Module/port, the egress port is picked up from the Egress port field of the Module Header. For Broadcast or DLF packet, the egress Port Bitmap is picked up from the IPIC VTABLE. For Multicast the egress Port Bitmap is picked up from IPIC MC Table. In case of IP Multicast the Port Bitmap is picked up from the IPIC IPMC Table. The L2 bitmap in IPMC and Mcast should be members of the VLAN. For every egress port in IPMC L3 bitmap, the L3 interface address and the VLAN ID should be programmed in the egress port(s).

The IPIC port can be a member of L2_BITMAP in IPMC Table. But the IPIC port cannot be a member of L3_BITMAP in IPMC Table. The default is to use the source IP address in IPMC lookup. IPMC_ENABLE should be set to same value in all copies of the CONFIG register. The IPIC can also operate in a cascade mode. Since there is only one IPIC per device, only Simplex Interconnection (or unidirectional ring) mode of operation is provided.

Figure 5:
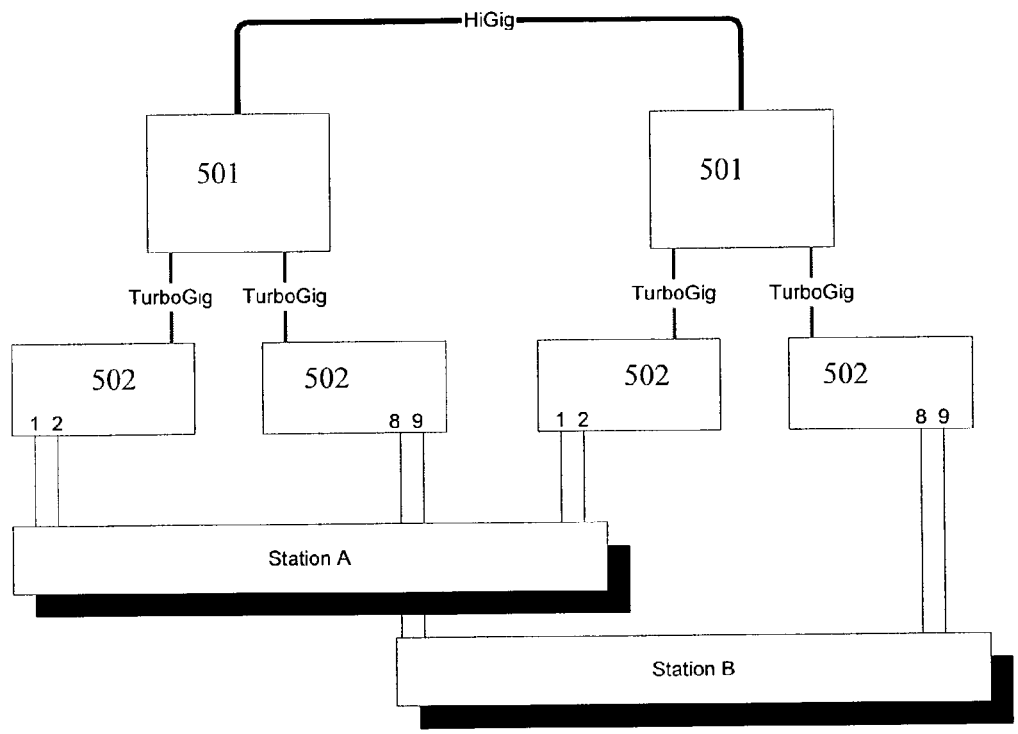
FIG. 5 illustrates an example of different types of stacking of switches in different configurations.

A unique feature of the present invention is seamless support for multiple styles of stacking at the same time. FIG. 5 shows an example configuration in which the both styles of stacking co-exist at the same time. In FIG. 5, the lower capacity devices 502 are connected to the higher capacity devices 501 using a TruboGig link as a Stacking link (SL Style Duplex). Station A is connected to a trunk port, which comprises of port 1 and 2 on the left most device 502 and ports 1, 2 on another device. Station B is connected to a trunk port which comprises of ports 8,9 on the right most device 502 and ports 8,9 on another device.

Figure 6:
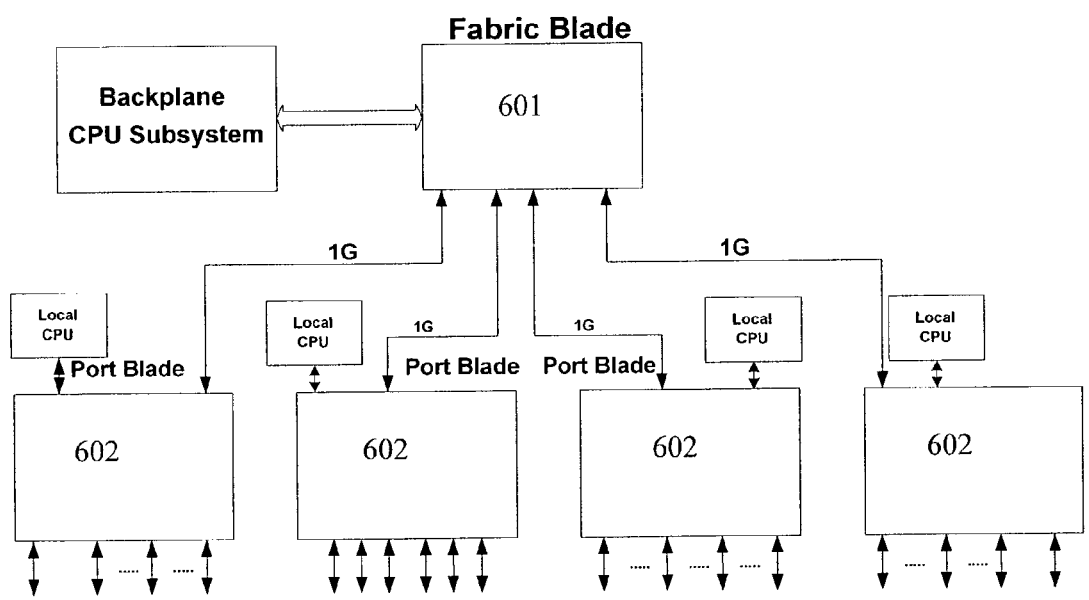
FIG. 6 illustrates a configuration of switches into port blades and a fabric blade.

The switches of the present invention can be used in many different applications. One such application involves a low cost chassis solution, which would have a many Port blades and a Fabric blade. The Fabric blade would have the CPU, while the Port blades may have a local CPU. In such a system, it may be necessary to send BPDUs and all management traffic to the CPU on the Fabric blade. FIG. 6 shows a schematic configuration of a 5 blade chassis.

Figure 7:
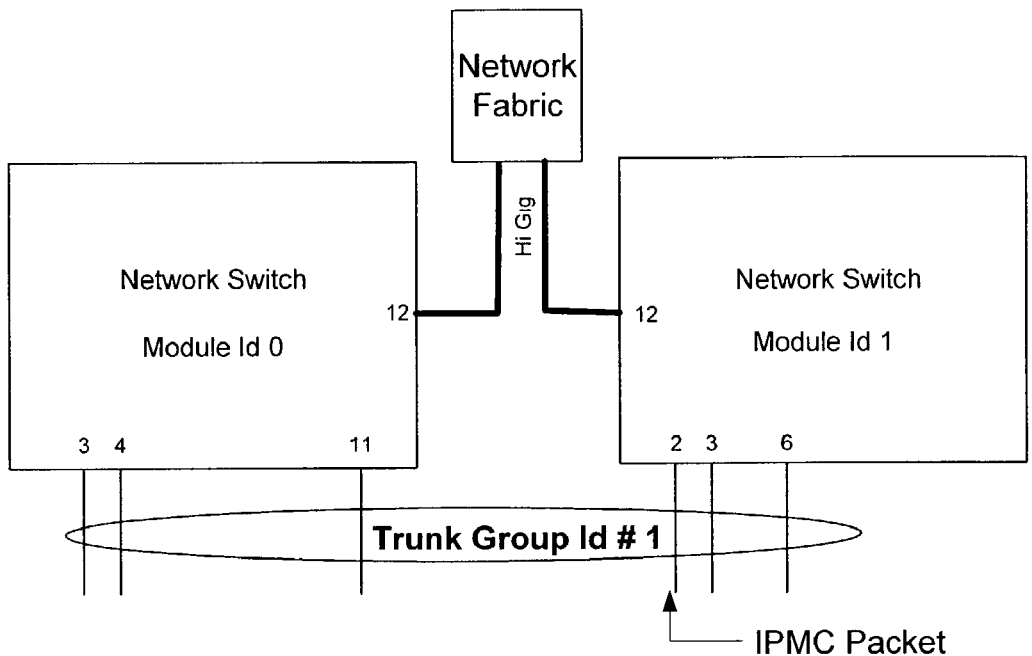
FIG. 7 illustrates a configuration of switches illustrating the trunking and the IP multicast L3 switching of packets.

The PORT_BITMAP in QVLAN_TABLE should include all members of the trunk group. A trunk group may span multiple modules. If an IP Multicast packet arrives on a trunk port that needs to be L3 switched back to the same trunk group, then it should go out on one of the local trunk ports (i.e., it can not be L3 switched on a trunk port on a different module). Consider the trunk group id #1 shown in FIG. 7. If an IPMC packet arrives on port 2, Module 1 and it needs to be L3 switched back on trunk group #1, then it should go out on one of the local trunk ports (2,3 or 6) in Module 1. The packet cannot be L3 switched to trunk ports on module 0. There is no metering on Trunk Group ID. It has to be done on individual ports. It depends on how these trunk ports are distributed across multiple modules.

In this mode of operation, the trunk ports span across the SL style stacking as well as HiGig style of stacking. The following points are required for this to work. All devices in the configuration should be configured to be in Stacking Mode. When the 501 device is in Stacking Mode, the ARL Logic in the 501 device will learn the address depending on whether the SRC_T bit in the Stack Tag is set or not set. In addition, the 501 device will have to insert its module id in the ARL Table. For example, if packet arrives on port 1 in left most 501 device from Station A, the ARL logic would learn the address, where the TGID and RTAG are picked up from the Stack Tag if the SRC_T bit is set. The RTAGS used are in two places (tTRUNK_GROUP_TABLE, tTRUNK_BITMAP_TABLE) and they are programmed identically.

The Stack Tag in the packet is passed on the HiGig along with the Module Header. If the destination port is a trunk port, the specific egress port (501) gets resolved in the source module itself. When the packet arrives at the destination module, the packet is sent to specific egress port in the 501 device. The module header is stripped by IPIC before it is sent to specific egress port. The packet when it goes to the 502 device will contain the Stack Tag and the egress port gets resolved based on the Stack Tag for trunked ports.

On the stack link, if filtering is enabled, then MASK fields in mask table should be set to 0. Additionally, the mask bits corresponding to stack tag must be set to 0. With respect to SL stacking, all packets are transmitted out of stack link with VLAN tag and Stack tag. The bit for stack links should be set to zero in the untag bitmap(s). The network device of present invention does not generally support multiple simplex stack links, i.e. only one port can be in simplex stacking mode. Additionally, mirroring is not supported if both simplex and duplex stack links are configured in one network device.

With respect to trunking, when there is trunking across a SL style stack, the stack link should be part of the Trunk Group Table. Additionally, the TRUNK_BITMAP should not contain stack link. When HiGig and SL Style stacking is present, the number of trunk groups allowed is limited by the number of ports and in a specific embodiment, is limited to six. With respect to L3 switching, the L3 load distribution on a trunk group is supported.

Figure 8:
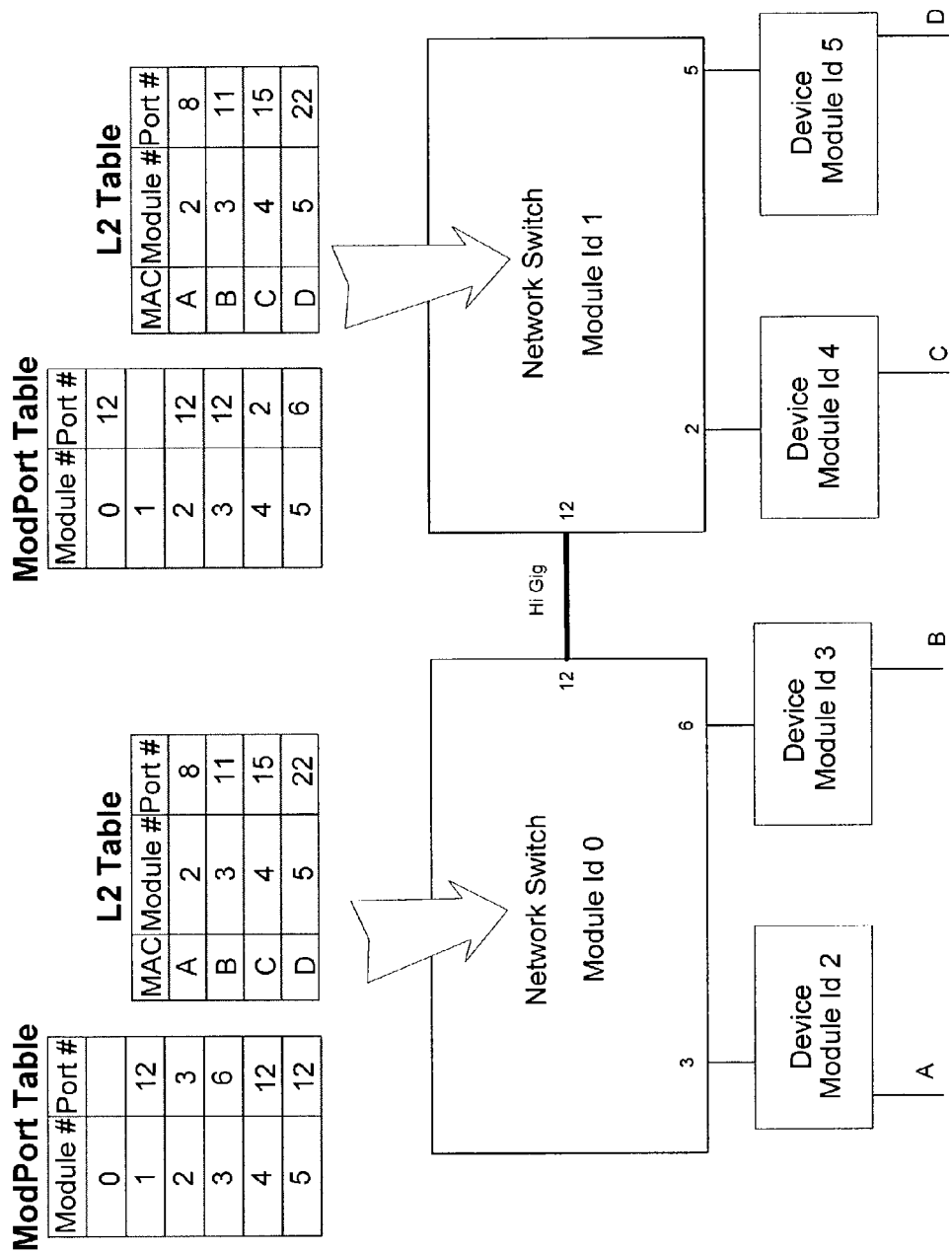
FIG. 8 illustrates the use of a unified module ID in interconnected network devices.

When multiple switches are connected together to form a system, each of them should be programmed with a system wide module id. i.e., each device should have a unique module id. The tMODPORT_TABLE in one of the switches should be programmed appropriately. Consider the system shown in the FIG. 8. The tMODPORT_TABLE should be programmed as shown in the figure.

Addresses are learned with Module Id and Source Port#. The Source Port# is the port that the packet arrived on. If the packet arrived on a second switch connected to a first switch, then the MAC address entry in the L2 table of the first switch has the module Id and the port corresponding to the second switch (see L2 Table in FIG. 8).

The Port blades 602 would be connected to the Fabric blade 601 through the Stacking link. When a BPDU arrives at one of the ports in the Port blade, the BPDU should be sent to the Fabric CPU. This is accomplished using the Port steering feature in the FFP. In addition, the source port of the BPDU packet should be conveyed to the Fabric CPU. This would require a change in the ingress logic, which is explained below.

The HiGig protocol of the present invention will now be discussed with respect to the switch architecture outlined above. HiGig protocol is a wrapper around the Ethernet packet. However, it does modify the packet. The VLAN tag is removed from the standard Ethernet frame and only the Tag Control field is transmitted. The HiGig header is essentially 12 bytes on the 10-GE interconnect that is carried in the preamble and the IFG field of the packet.

The HiGig specification is intended for interconnecting modular Gigabit switches through a 10GE interconnect, which can be either stackable solutions or chassis system to provide high density. The HiGig protocol can be applied to any physical media that can run full-duplex Ethernet packets. The HiGig protocol simplifies the hardware forwarding decision as the packet traverses from one switch chip to another.

This protocol enables the forwarding of packets between modular chips that are interconnected to form a single system. The protocol provides support for address learning, forwarding of different types of packet and unmanaged mode of operation across the chips.

In the unmanaged mode, several registers have default values. These include having the VLAN ID in the IPIC being identical and there should be no filtering. The CPU is not included in the QVLAN_TABLE.PORT_BITMAP and there is no L3 switching in the unmanaged mode. There is also no explicit support for stacking provided in the unmanaged mode and the trunking or mirroring of ports is not allowed.

In the following, the term "HiGig header" is used to refer to the header that goes in front of the Ethernet payload. The HiGig header contains the Tag Control field and the Module header. The CRC in the Ethernet payload is recalculated by the sending end to include the HiGig header and the Ethernet payload. The receiving end will format the packet according to the module header and will strip the module header, insert the VLAN tag in the packet and send it out on the egress port in the local module. If the receiving end needs to send out the packet again (e.g. mirroring), the packet is sent out on the HiGig interface with the HiGig header.

The module header is a 6-byte field and contains the following fields:

For the first 32 bits of header:

TABLE 1

| Field Name | # of Bits |
|---|---|
| OPCODE | 3 |
| SRC_MODID | 5 |
| SRC_PORT_TGID | 6 |
| DST_PORT | 5 |
| DST_MODID | 5 |
| COS | 3 |
| PFM | 2 |
| CNG | 1 |
| HEADER_FORMAT | 2 |
| Unused | 0 |
| Total | 32 |

Default usage for bits 33 to 48 of the Header:

TABLE 2

| Field Name | # of Bits |
|---|---|
| MIRROR | 1 |
| MIRROR_DONE | 1 |
| MIRROR_ONLY | 1 |
| INGRESS_TAGGED | 1 |
| DST_T | 1 |
| DST_TGID | 3 |
| Unused | 8 |
| Total | 16 |

Overlay 1 for bits 33 to 48 of the Header:

TABLE 3

| Field Name | # of Bits |
|---|---|
| CLASSIFICATION_TAG | 16 |
| Unused | 0 |
| Total | 16 |

The OPCODE in the module header defines the type of packet. The following are the defined packet types:

0=Control Frames for CPU to CPU communication

1=Unicast packet with destination uniquely identified

2=Broadcast/DLF packet, destined for all ports on the VLAN in the Ethernet frame.

3=L2 Multicast Packet with the index into the multicast group specified in the DST_PORT/DST_MODID fields.

4=IP Multicast Packet with the index into the IP Multicast group specified in the DST_PORT/DST_MODID fields.

5, 6, 7=Reserved

The SRC_MODID and the SRC_PORT_TGID fields together carry the source port/trunk group and source module id of the packet. The DST_MODID and the DST_PORT fields together carry the destination module id and destination port of the packet. For Multicast and IP Multicast packets these two fields together are overlaid with the index into the multicast group. When the packet is received in another module, the DST_MODID and DST_PORT fields are interpreted depending on the OPCODE. The COS bits specify the modified Priority of the packet. This may not be the same as the VLAN Priority in the Ethernet tag.

The Port Filtering Mode comes from the ingress port's PORT_TABLE entry. This specifies handling of the registered/unregistered group addresses, which is specified in the 802.1D standard. The CNG bit specifies that for the specified COS, the packet experienced congestion in the source module.

The Header Format defines the format of the second 16 bits of the header—

0=default value, as defined in the above table;

1=the second 16 bits carry the Classification Tag; and

2,3=reserved.

The mirror bit specifies that the packet needs to be mirrored. This bit along with the next two bits defined below are needed to support mirroring. The MIRROR_DONE bit is set when the packet has been mirrored. The packet may still need to be switched. The MIRROR_ONLY bit indicates that the packet has been switched and only needs to be mirrored. With respect to mirror control, all fields of the MIRROR_CONTROL register should be the same on all ports with the exception of M_ON_PORT.

The INGRESS_TAGGED bit is used to facilitate 24+ port unmanaged operation and indicates if the packet came into the system tagged or untagged. In order to terminate SL-style of stacking, the SL-style of stack tag is mapped to the Module header. Only the DST_D and DST_TGID fields cannot be mapped in the Module header. Therefore they are carried in the Module header. The classification tag field is valid if the HEADER FORMAT is 1.

The HiGig header format on the 10-Gigabit interface is as follows:

TABLE 4

| VID | Module Header | DA | SA | CRC |
|---|---|---|---|---|
| (2 bytes) | (6 bytes) | (6 bytes) | (6 bytes) | (4 bytes) |

The VLAN tag is not present in the Ethernet packet. Instead, the Tag Control field (VID, CFI and PRIORITY) is appended in front of the packet followed by the Module header. The Ethernet CRC is the CRC computed over the VID, Module header and the Ethernet payload.

Figure 9:
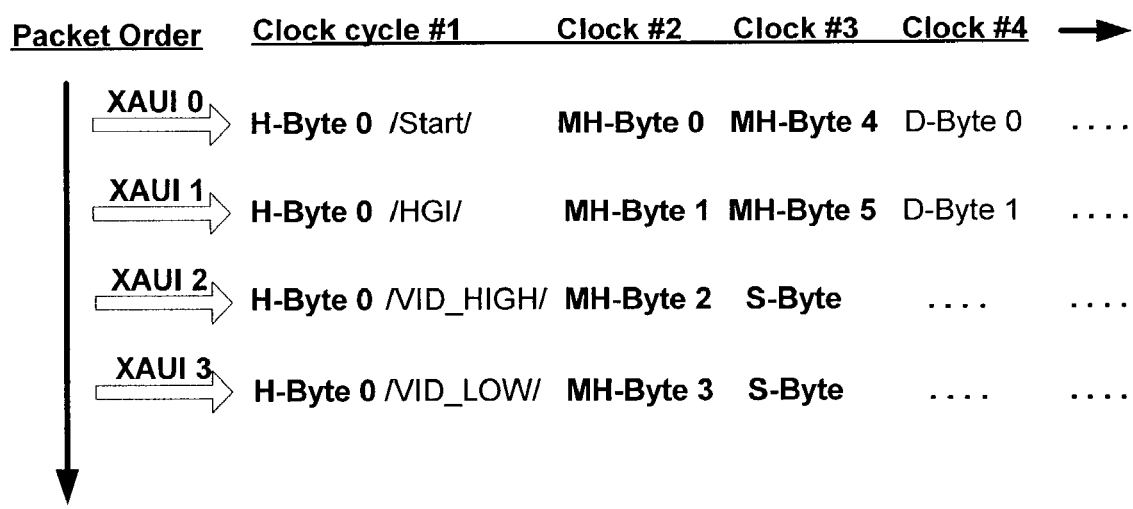
FIG. 9 illustrates a conceptual overview of how the module header is striped on the XAUI lanes.

The block diagram in FIG. 9 gives a conceptual overview on how the Module Header is striped on the XAUI (Attachment Unit Interface) lanes. In the diagram, H-Byte is a header byte, MH-Byte is a Module Header Byte, S-Byte is a spare byte and D-Byte is a data payload byte. HGI refers to HiGig Indicator. The HiGig Indicator should be set to the appropriate value to indicate that the trailing bytes contain the module header.

The HiGig header provides overhead on each packet. A 64 byte untagged packet on a HiGig interface essentially becomes a 72-byte packet. In order to achieve line rate on the 10-GE interconnect, the IFG in the 10-GE MAC should be programmed to 9 bytes (average). The 6-bytes of module header is stuffed completely in the preamble of the packet. The sending end removes the VLAN tag (4 bytes) and only the Tag Control field (2 bytes) is appended to the beginning of the packet. This essentially allows ten GE ports streaming 64-byte untagged packet to the 10-GE interconnect to achieve line rate performance.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch for network communications, said network switch comprising:
   a first data port interface, said first data port interface supporting at least one data port transmitting and receiving data at a first data rate;
   a second data port interface, said second data port interface supporting at least one data port transmitting and receiving data at a second data rate;
   a memory management unit for communicating data from at least one of said first data port interface and said second data port interface and a memory;
   a communication channel, said communication channel for communicating data and messaging information between said first data port interface, said second data port interface, and said memory management unit; and
   a plurality of lookup tables, said lookup tables including an address resolution lookup table, a VLAN table and module port table;
   wherein said network switch has a unique module identifier, and
   wherein one of said first data port interface and said second data port interface is configured to determine forwarding information from a header for an incoming data packet received at a port of said one of said first data port interface and said second data port interface, and is configured to determine the forwarding information from the header and to determine a destination module identifier for a destination port for the data packet from the module port table.

2. A network switch as recited in claim 1, wherein said one of said first data port interface and said second data port interface is configured to send the data packet over a specialized interface to a connected second network switch when the destination module identifier is different from the unique module identifier of the network switch.

3. A network switch as recited in claim 1, wherein said header contains an opcode that identifies whether the incoming data packet is a unicast packet, a multicast packet, a broadcast packet or resulted in a destination lookup failure.

4. A network switch as recited in claim 3, wherein at least one of said first data port interface and said second data port interface is configured to be a member of a trunk group and the one of said first data port interface and said second data port interface is configured to determine the destination port for the data packet based on the opcode.

5. A method of switching data in a network switch, said method comprising:
   receiving an incoming data packet at a first port of a switch;
   reading a first packet portion, less than a full packet length, to determine particular packet information, said particular packet information including a source address and a destination address;
   obtaining a destination port and a destination module identifier from a module port table based on said particular packet information;
   comparing the destination module identifier with a unique module identifier for the network switch; and
   sending the incoming data packet to the destination port.

6. A method as recited in claim 5, wherein said step of sending the incoming data packet to the destination port comprising sending the data packet over a specialized interface to a connected second network switch when the destination module identifier is different from the unique module identifier of the network switch.

7. A network switch as recited in claim 5, wherein said header contains an opcode that identifies whether the incoming data packet is a unicast packet, a multicast packet, a broadcast packet or resulted in a destination lookup failure and the step of reading the first packet portion comprises reading the opcode.

8. A network switch as recited in claim 7, wherein the step of obtaining a destination port further comprises determining whether the destination port is a member of a trunk group and determining the destination port for the data packet based on the opcode.

9. A network switch comprising:
   means for receiving an incoming data packet at a first port of a switch;
   means for reading a first packet portion, less than a full packet length, to determine particular packet information, said particular packet information including a source address and a destination address;
   means for obtaining a destination port and a destination module identifier from a module port table based on said particular packet information;
   means for comparing the destination module identifier with a unique module identifier for the network switch; and
   means for sending the incoming data packet to the destination port.

10. A network switch as recited in claim 9, wherein said means for sending the incoming data packet to the destination port comprising means for sending the data packet over a specialized interface to a connected second network switch when the destination module identifier is different from the unique module identifier of the network switch.

11. A network switch as recited in claim 9, wherein said header contains an opcode that identifies whether the incoming data packet is a unicast packet, a multicast packet, a broadcast packet or resulted in a destination lookup failure and the means for reading the first packet portion comprises means for reading the opcode.

12. A network switch as recited in claim 11, wherein the means for obtaining a destination port further comprises means for determining whether the destination port is a member of a trunk group and means for determining the destination port for the data packet based on the opcode.

* * * * *